March 5, 1968 YOSHIYASU KIKUCHI 3,372,385

ELECTRIC SIGNAL DELAY CIRCUIT

Filed Dec. 27, 1962

INVENTOR.
YOSHIYASU KIKUCHI

BY

OSTROLENK, FABER, GERB & SOFFEN

ATTORNEYS

United States Patent Office 3,372,385

Patented Mar. 5, 1968

3,372,385

ELECTRIC SIGNAL DELAY CIRCUIT

Yoshiyasu Kikuchi, Shiba Mita, Minatoku, Tokyo, Japan, assignor to Nippon Electric Company Limited, a corporation of Japan Filed Dec. 27, 1962, Ser. No. 247,607
Claims priority, application Japan, Dec. 28, 1961, 36/47,951
9 Claims. (Cl. 340—174)

Figures 1, 2:
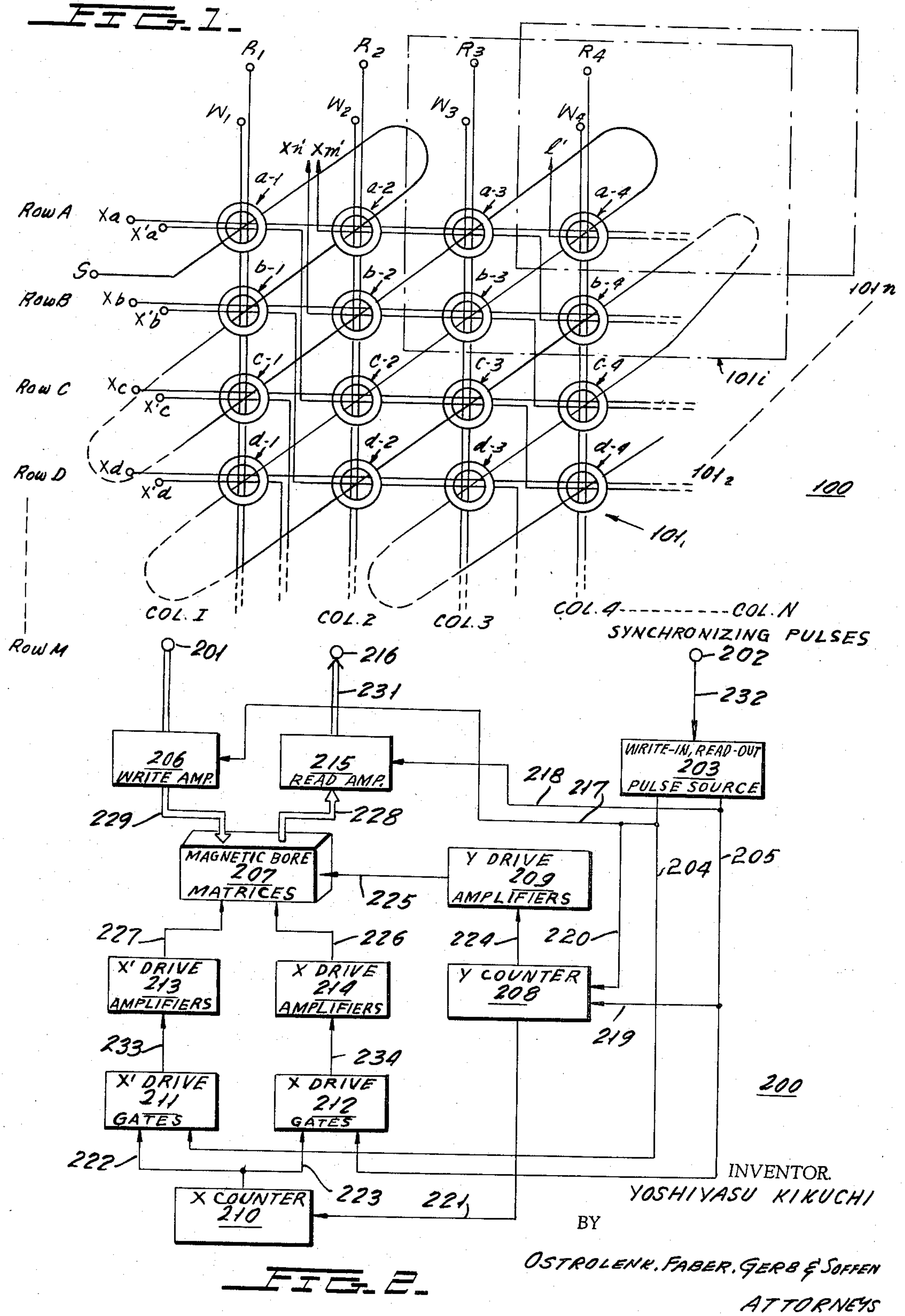

This invention relates to electrical circuitry and more particularly to electrical circuits employing magnetic storage elements in a unique arrangement for delaying electrical signals for selected delay periods and may further be employed to impart both time delay and signal rearrangement to information signals imposed upon the system.

In circuit applications where it is necessary to time delay electrical information signals for predetermined time periods it has been conventional to utilize delay line circuitry or register circuitry (i.e. of the shift register type) to perform such operations. Delay line circuits have the inherent defect that the length of such lines must be increased in order to increase the delay time while register circuits have the inherent defects that the number of electrical signal trains employed therein become quite large and also the number of active elements of which the register is comprised, such as, for example, transistors and/or vacuum tubes, must be increased with the increased number of delay periods desired.

The instant invention is capable of providing predetermined delay periods of any desired delay time length while at the same time employing a substantially small number of active elements relative to the number of active elements employed in conventional delay circuits.

The instant invention is comprised of a plurality of magnetic element matrices arranged, for example, in a straight line fashion. Each of said matrices is comprised of a plurality of magnetic elements arranged in a regular matrix of N columns and M rows. The magnetic elements employed in the above matrices are capable of being driven to either of two saturable states and, having been driven to either of the two saturable states are further capable of remaining in the state to which they are driven for an indefinite time period or at least until they are driven into the opposite state of saturation.

The matrices of the above mentioned matrix group are each provided with N write-in windings arranged in columnar fashion so that each such write-in winding threads all magnetic elements of the associated column. N read-out windings are likewise provided, such that each read-out winding is arranged in columnar fashion and is associated with one of the N write-in windings.

Each matrix is further provided with M X-drive windings arranged in row fashion so as to thread all magnetic elements associated with the row of X-drive winding. A single Y-drive winding is provided for each matrix which is arranged so that it threads all magnetic elements contained in the matrix.

M X′-windings are further provided for each matrix of the matrix group and are threaded through the magnetic elements in such a manner that each of said X′-drive windings threads magnetic elements of a plurality of different rows wherein the magnetic elements threaded by the X′-drive windings determine the delay times which the input signals to be delayed will experience.

In order to impart a predetermined time delay to an input signal train first means are provided for imposing said input signals upon the write-in windings. Simultaneously therewith, and during a write-in operation, further means are provided for simultaneously energizing the X′-drive windings and the Y-drive windings in a successive manner in order to write-in or store the signal group to be delay in the delay matrix group.

After storage of said input signals further means are provided for simultaneously energizing the X-drive windings and the Y-drive windings so as to cause a read-out of the electrical signals stored in said matrix group. The delay period between write-in and read-out is determined by the relationship between the M X-drive windings and the M X′-drive windings in such a manner that any one of a plurality of delay periods may be selected therefrom in order that the desired delay be imposed upon the input signals. The magnetic elements capable of existing in either of two saturable states for an indefinite time period may be selected from the group of magnetic cores, multi-apertured magnetic plates and so forth.

It is therefore one object of this invention to provide an electric signal delay circuit having a novel arrangement for imposing any one of a plurality of delay periods upon incoming signal information.

Another object of the instant invention is to provide an electric signal delay circuit for imposing any one of a plurality of predetermined delay periods upon incoming electric signals wherein the electric signal delay circuit is comprised of magnetic element matrices.

Still another object of the instant invention is to provide an electric signal delay circuit comprised of magnetic element matrices having novel drive windings which are inductively coupled to the magnetic elements in such a manner as to impose a plurality of delay periods upon incoming electrical signals.

Another object of the instant invention is to provide a novel electric signal delay circuit comprised of magnetic core matrices each having write-in windings, read-out windings, X-drive windings and Y-drive windings.

Another object of the instant invention is to provide a novel electrical signal delay circuit comprised of magnetic core matrices each having write-in windings, read-out windings, X-drive windings, Y-drive windings, and further having novel X′-drive windings capable of imparting a plurality of predetermined time delays to incoming electric signals.

Another object of the instant invention is to provide a novel electrical signal delay circuit comprised of a plurality of matrices of magnetic core elements, each matrix having write-in windings, read-out windings, a Y-drive winding, X-drive windings and X′-drive windings capable of delaying or delaying and rearranging incoming electrical signals.

These and other objects of the instant invention will become apparent when reading the accompanying description and drawings in which; FIGURE 1 illustrates a magnetic core memory matrix group designed in accordance with the principles of the instant invention.

FIGURE 2 shows a schematic block diagram of a control circuit employed to control the operation of the magnetic core memory matrix group of FIGURE 1.

Referring now to the drawings; FIGURE 1 shows a magnetic core memory matrix group 100 comprised of a plurality of core matrices $101_1$–$101_n$. Core matrices $101_1$ and $101_n$ are shown in phantom line fashion and core matrices $101_2$–$101_{i-1}$ and $101_{i+1}$–$101_{n-1}$ having been omitted for the purposes of clarity, it being understood that each of the core matrices $101_2$–$101_n$ are substantially identical in structure and function to the core matrix $101_1$. The core matrix $101_1$ is comprised of a plurality of magnetic core memory elements arranged in N columns and M rows, for example. Row A is comprised of magnetic core elements *a*–1—*a*–4; row C is comprised of magnetic core elements *c*–1—*c*–4; and column 1 is comprised of magnetic core elements *a*–1, *b*–1, *c*–1 and *d*–1; and column 4 is comprised of magnetic core elements *a*–4, *b*–4, *c*–4 and *d*–4. While FIGURE 1 shows core matrix $101_1$ as being comprised of a 4 x 4 core matrix it should be understood that core matrix $101_1$ (and hence core matrices $101_2$–$101_n$) may be comprised of a greater or lesser number of columns and rows other than the exemplary embodiment $101_1$ of FIGURE 1. Each of the columns 1–4 is provided with a read-out winding $R_1$–$R_4$ respectively, such that each of said read-out windings thread the magnetic cores of the associated column. For example, in column 3 read-out winding $R_3$ threads magnetic core elements *a*–3, *b*–3, *c*–3 and *d*–3. Columns 1–4 are further provided respectively, with write-in windings $W_1$–$W_4$ wherein each of said write-in windings threads the cores associated with that column. For example, the write-in winding $W_4$ of column 4 threads magnetic core elements *a*–4, *b*–4, *c*–4 and *d*–4.

Each of the rows of matrix $101_1$, such as, for example, rows A–D are provided with X drive windings X*a* through X*d* respectively, wherein each of said X drive windings threads the cores of its associated row. For example, X-drive winding X*b* threads cores *b*–1, *b*–2, *b*–3 and *b*–4 contained in row B. It should be understood that the remaining X-drive windings X*a* and X*c*–X*d* thread the cores of their associated rows in a like manner.

Core matrix $101_1$ is further provided with a Y-drive winding S which is arranged in such a manner as to thread all of the cores of the matrix $101_1$. For example, moving along Y-drive winding S it can be seen that winding S threads in succession magnetic core elements *a*–1, *a*–2, *b*–1, *c*–1, *b*–2, *a*–3, *a*–4, etc. The core matrix $101_1$ is further provided with novel X′-drive windings such that the input terminals at the left-hand end of core matrix $101_1$ are each associated with a respective row A–D of the core matrix. However, as can be seen from FIGURE 1, each of the X′-drive windings X′*a*–X′*d* threads magnetic core elements of a plurality of different rows contained in the core matrix. For example, drive winding X′*a* threads, in succession, magnetic core elements *a*–1 (of row A), *c*–2 and *c*–3 (of row C), and *d*–4 (of row D); and drive winding X′*b* threads, in succession, magnetic core elements *b*–1 (of row B), and *d*–2 and *d*–3 (of row D). Thus each of the X′-drive windings is related to each of the X-drive windings in a unique fashion. It should be understood that the X′-drive windings thread the cores of a larger core matrix than that shown in FIGURE 1 in a substantially similar manner and no novelty is considered to exist in either increasing or decreasing the number of rows and columns of the core matrix $101_1$.

Each core matrix $101_1$–$101_n$ is capable of storing one incoming bit or signal pulse of information of a plurality of incoming signal or pulse trains. For example, in a pulse train having a pulse or bit length *n* each of the *n* pulses or bits are imposed upon one of the respective core matrices $101_1$–$101_n$.

Before consideration of the write-in operations, the following current and winding relationships should first be understood. The write-in windings $W_1$ through $W_4$ each normally receive a one-half current pulse with the windings threading the cores in such a way as to cause the current pulse to drive the core element which it threads midway toward the binary zero saturable state. The winding $X'_a$ receives a half current pulse and is threaded through its associated core element to cause the core elements to be driven midway toward the binary one saturable state. The Y windings, such as, for example, the Y winding S, receives a half-current pulse and is threaded in such a way through all cores of the matrix $101_1$ as to drive all cores of this matrix plane midway toward the binary one saturable state. This write current pulse is followed by a read current pulse of the reverse polarity and of a half-current pulse magnitude sufficient to drive the core midway to the binary zero saturable state. The $X_a$ winding receives a half-current pulse and is threaded in such a way as to drive the cores associated therewith midway toward the binary one saturable state. In the case where the input information is binary zero all write-in windings $W_1$ through $W_4$ receive a half-current pulse driving all cores midway toward the binary zero saturable state. The $X'_a$ winding drives the cores associated therewith, namely cores *a*–1, *c*–2, *c*–3 and *d*–4, midway toward the binary one saturable state thus effectively cancelling the current pulses in the write windings yielding a net zero effect on the cores *a*–1, *c*–2, *c*–3 and *d*–4. The write pulse of windings S drives the cores midway to the binary one saturable state so that the net effect on all cores is to be driven midway toward the binary one saturable state so that no cores whatsoever will be driven to the binary one saturable state. Those cores whose write-in windings receive a binary one information bit will fail to receive an inhibit half-current pulse allowing the $X'_a$ winding and the S winding to drive the associated cores into the binary one saturable state.

The write-in operation occurs as follows:

The first incoming signal pulse or information bit is simultaneously imposed upon selected ones of the write-in windings $W_1$–$W_4$. Simultaneously therewith Y-drive winding S and X′-drive winding X′*a* are energized. Assuming the first incoming pulse to be in the binary one condition the non-energization of write-in windings $W_1$–$W_4$, the energization of Y-drive winding S and the energization of X′-drive winding X′*a* cause the magnetic core elements *a*–1 (of row A), *c*–2 and *c*–3 (of row C) and *d*–4 (of row D) to assume the state of saturation representative of the write-in of a binary one condition. It should be understood that prior to the initiation of the write-in operation that all of the cores *a*–1—*d*–4 have been reset so that they are in the saturable state representative of a binary zero condition. Thus only the magnetic cores *a*–1, *c*–2, *c*–3 and *d*–4 have been driven to the binary one state (assuming insertion of a binary one data bit), the remaining cores of the matrix retaining their binary zero saturation state.

Each of the remaining signal pulses of the incoming pulse train of pulse length *n* are written-in to the core matrices, $101_2$–$101_N$ in a similar manner and further such that each of the Y drive windings T, U, V, W . . . of matrices $101_2$–$101_N$ are energied one at a time in a sequential manner with the X′*a* drive winding of each of the core matrices $101_N$–$101_n$ remaining in the energized state until all of the Y-drive windings have been sequentially energized.

Before the actual readout operation is considered the following current and winding direction relationships will first be considered. As was previously mentioned each of the Y windings such as, for example, the winding S for matrix plane $101_1$, generates a positive going half current pulse immediately followed by a trailing negative half current pulse. The other readout row windings X*a* receive a half current pulse which occurs in time synchronism with the negative going half current pulse of winding X with the effect of both pulses being to drive the cores with which they are jointly associated into the binary zero saturable state. Thus, the positive going half-current pulse of each Y winding, during a readout operation, is ineffective in driving the cores to a binary one saturable state and the state to the cores just prior to receipt of the positive going pulse remain the same immediately after the receipt of this positive pulse and are not effective unless they jointly receive the negative going pulse in time synchronism with a negative going half going pulse from the energized readout windings $X_m$.

The read-out operation is performed as follows:

Upon completion of the write-in operation, i.e., after the last Y-drive winding associated with core matrix $101_N$ has been energized, the X′-drive winding X′*a* is de-energized and the X-drive winding X*b* is energized simultaneously with the energization of the Y-drive winding S. The Y-drive windings S, T, U, V, W . . . are again sequentially energized in the manner as previously described to effect the write-out operation, the Y-drive winding S being the first Y-drive winding of the sequence.

to be energized. This causes X-drive winding $Xb$ and Y-drive winding S to simultaneously be in the energized state in order to drive the magnetic core elements which they jointly thread towards the binary zero saturation state. The magnetic core elements which are jointly threaded by drive winding $Xb$ and drive winding S are core elements $b$–1, $b$–2, $b$–3, and $b$–4. It should be noted, however, that none of the magnetic core elements $b$–1—$b$–4 of row B were driven to the binary one state so that they are still in the binary zero saturable state. Thus the driving of magnetic core elements $b$–1—$b$–4 provides no output at each of the read-out windings $R_1$–$R_4$ indicative of a binary zero condition. Each of the remaining core matrices $101_2$–$101_N$ will be sequentially stepped in a like manner and in every case each of these core matrices will produce no signals at each of their read-out windings.

After each of the Y-drive windings S, T, U . . . has been stepped in succession and the drive winding associated with core matrice $101_N$ has been energized causing drive winding $Xc$ to be energized. The U-drive windings S, T, U . . . are then again sequentially stepped during the second read-out period. The core matrix $101_1$ being the first of the core matrices to be energized finds windings $Xc$ and S simultaneously in the energized state so as to cause the magnetic core elements $c$–1—$c$–4 of row C to be driven towards the binary zero saturation state. While magnetic core elements $c$–1 and $c$–4 are already in the binary zero saturable state, it should be noted that core elements $c$–2 and $c$–3 were driven to the binary one saturable state during the write-in period and due to the energization of drive winding $X'a$ during said write-in period. Thus magnetic core elements $c$–2 and $c$–3 generate signals in read-out windings $R_2$ and $R_3$ while cores $c$–1 and $c$–4 fail to generate signals in read-out windings R–1 and R–4 respectively. This condition is therefore indicative of the presence of a binary one state in that position of the $n$ pulse length incoming pulse train associated with row winding $Xc$. In a like manner the remaining matrices $101_2$–$101_N$ are energized causing a successive read-out of the remaining pulses of the incoming pulse train which was to be delayed. Thus it can be seen that the incoming pulse train which was written in to the matrix group 100 during the write-in period was read-out of the matrix group 100 not during the first read-out period but during the second read-out period thereby imposing a delay upon the incoming pulse train of a time duration equal in length to one read-out period.

It should further be noted that after all of the Y-drive windings have been sequentially stepped during the second read-out period the stepping operation will begin again with the first core matrix $101_1$ and simultaneously therewith drive windings $Xc$ is deenergized while drive winding $Xd$ becomes energized. Since magnetic core element $d$–4 was driven to the binary one state during the write-in period it can be seen that read-out winding $R_4$ will provide a read-out signal at this time indicative of binary one signal stored in core element $d$–4. The remaining core matrices $101_2$–$101_n$ will be sequentially energized in a like manner and it can therefore be seen that the incoming pulse train of $n$ pulse length will also be read-out during the third read-out period thereby imposing a time delay upon the incoming pulse train equal in length to two read-out periods.

If it is desired to delay an incoming pulse train for only one time period of one predetermined time length, this may be carried out by de-energizing only a selected one of the write-in windings $W_1$–$W_4$. For example, if it is desired to impose a delay period equal in length to the length of three read-out periods this may be carried out by de-energizing only write-in winding $W_4$ during the write-in period. This thereby causes the drive windings $X'a$ and S together with write-in winding $W_4$ to drive only the magnetic core element $d$–4 into the binary one saturable state. Thus the first and second read-out periods will provide no readout while the incoming pulse train will be read-out during the third read-out period (the period during which drive winding $Xd$ is energized) due to the simultaneous energization of drive windings S and $X'a$ simultaneously with the de-energization of write-in winding $W_4$ which causes only magnetic core element $d$–4 to be energized during the write-in period. In a like manner, any other write-in winding may be selected dependent only upon the length of the delay period which it is desired to impose upon the incoming pulse train. It should further be understood that the X'-drive windings may be threaded in a variety of different manners other than the manner shown in FIGURE 1 of the drawings in order to impose a variety of different delay periods upon incoming pulse trains. For example, instead of drive winding $X'a$ threading cores $a$–1, $c$–2, $c$–3, and $d$–4, winding $X'a$ may be threaded so that it inductively couples core elements $a$–1, $b$–2, $c$–3 and $d$–4. It can clearly be seen that a variety of other threaded configurations are possible.

FIGURE 2 shows the control circuitry 200 employed for controlling the operation of core matrix group 100, shown in FIGURE 1, and is comprised of an input terminal 201 for receiving the electric signal trains which are to be delayed. These signal trains are impressed upon terminal 201 in such a manner that each pulse of the $n$ pulse length pulse train is impressed upon terminal 201 on a one at a time sequential basis. Terminal 201 is connected to a time sequential basis. Terminal 201 is connected to a plurality of write-in amplifiers designated by block 206, each of which are connected to an associated column of the core matrix group by means of lead 229, the core matrix group being represented by the block 207. It should be understood that the core matrix group 207 is comprised of $n$ individual core matrices each being of the type shown in FIGURE 1. It should further be understood that the write-in amplifiers 206 may be selectively de-energized in any suitable manner so as to impart a delay of a predetermined time duration as described previously, the length of the delay being determined by the energized write-in amplifier. In the alternative, all of said write-in amplifiers may be disabled to provide the delay operation in the first manner previously described. Terminal 202 designates the input terminal to which a synchronizing signal train is applied, which signals are synchronized with the signals of the incoming electric signal train to be delayed, in any suitable manner. The synchronizing signals are impressed upon a conversion circuit 203 by means of lead 232. Synchronizing circuit 203 converts the incoming synchronizing signals to either write-in or read-out timing pulses dependent upon whether the delay circuit is to be operated in a write-in or a read-out period. Circuit 203 is normally comprised of a combination of gating circuits and monostable multivibrator circuits arranged in such a manner as to generate $n$ synchronizing signals at output terminal 204 during a write-in period and $n$ synchronizing signals at its output lead 205 during a read-out period. The write-in signals are impressed via lead 204 during a write-in period upon the X'-drive gate circuits 211 so as to enable all of the $m$ gates contained therein for a purpose to be more fully described. Simultaneously therewith the write-in timing pulses are impressed upon Y-direction counter 208 via lead 220 and upon write-in amplifiers 206 via lead 217. The write-in pulses are employed to cause Y-direction counter 208 to step through a count of 0–$n$ representative of the $n$ core matrices for a purpose to be more fully described. Write-in timing pulses impressed upon write-in amplifier circuit 206 enable the amplifiers contained therein to be selectively driven into the energized state by the incoming signal train impressed upon terminal 201.

During the read-out period read-out timing pulses X are impressed upon lead 205 from conversion circuit 203 and are employed to enable the X-drive gates contained in X-drive gate circuitry 212. This enables all of the M gates contained therein for a purpose to be more fully described. Simultaneously therewith the read-out timing pulses are impressed upon Y-direction counter 208 causing counter 208 to run through a count from 0–$n$ which is employed to energize the $n$ core matrices in a manner to be more fully described. In addition thereto the read-out timing pulses are impressed via lead 218 to read-out amplifiers 215 enabling the $n$ amplifiers contained therein in order to readout the delayed pulse train after a predetermined time delay, in a manner to be more fully described. The output of Y-direction counter 208 is connected via lead 224 to Y-drive amplifiers 209 and via lead 221 to X-direction counter 210. The Y-drive amplifiers are then enabled in a one at a time sequential fashion in order to sequentially energize each of the $n$ core matrices in the manner previously described. Upon the completion of a count of $n$ pulses, Y-direction counter 208 generates a pulse which is impressed upon X-direction counter 210 via lead 221 causing the count of X-direction counter 210 to be advanced by one. The output of X-direction counter 210 is simultaneously impressed upon the X′-drive gates 211 and the X-drive gates 212 via leads 222 and 223, respectively. Thus, during a write-in period, write-in timing pulses are impressed upon all of the X′-drive gates 211 and simultaneously therewith X-direction counter 210 opens one of the M X′ drive gates causing one of the M X′-drive windings at this time to be energized.

It should be noted that during the write-in period no read-out timing pulses are impressed upon X-drive gates 212 so that even though X-direction counter 210 enables one of the M X-drive gates 212, none of these gates will be opened due to the absence of read-out timing pulses. During the write-in period the X′-drive gate which has been opened energizes an associated X′-drive amplifier 213 via lead 233. The energized X′-drive amplifier in turn energizes one of the X′-drive windings via lead 227. Simultaneously therewith the Y-direction counter 208 energizes one of the $n$ Y-drive amplifiers 209 which in turn energizes the associated Y-drive winding of the Y-drive winding group S, T, U . . . .

The operation of the control circuit 200 during a write-in period is as follows:

The input signal train to be delayed is impressed upon terminal 201 and a selected one, or selected ones, or all of the write-in amplifiers 206 are disabled depending upon the time delay period or periods which it is desired to delay the incoming pulse train. Simultaneously therewith the incoming synchronizing pulse train is impressed upon conversion circuit 203 via terminal 202 and lead 232. These pulses are identified as write-in pulses causing write-in timing pulses to be generated at lead 204 and transferred via lead 217 to the write-in amplifiers 206. Thus the simultaneous presence of an input signal train upon terminal 201 and write-in timing pulses upon lead 217, together with the selection of a selected one or certain ones of said write-in amplifiers 206 causes certain of the write-in windings, such as the write-in windings $W_1$–$W_4$ of FIGURE 1 to be energized.

Simultaneously therewith the write-in timing pulses are impressed upon Y-direction counter 208 via lead 220. Immediately prior to the stepping of Y-direction counter 208 X-direction counter 210 contains a count of one. This count of one is transferred to the first of the X′-drive gates 211 and due to the presence of write-in timing pulses in lead 204 the first X′-drive gate is energized energizing the first X′-drive amplifier of the drive amplifier group 213 causing the X′-drive winding X′$a$ of the first core matrix of core matrix group 207 to be energized. During this time the Y-direction counter 208, upon receipt of the write-in timing pulses, energizes the Y-drive amplifiers 209 in a sequential fashion in order to sequentially energize the Y-drive windings, S, T, U . . . in the manner previously described, via lead 225. Thus, all of the X′$a$-drive windings of each core matrix $101_1$–$101_n$ are simultaneously energized while only one of the Y-drive windings is energized at any given instant during the write-in period.

Y-direction counter 208 under control of the write-in timing pulses, steps through a count of $n$ to sequentially energize each of the Y-drive windings. Thus during the write-in period predetermined cores of each of the core matrices $101_1$–$101_n$ remain in the binary zero state due to the simultaneous energization of the write-in windings $W_1$–$W_4$, the X′-drive winding X′$a$ and the Y-drive windings S, T, U . . . (which are energized in a sequential fashion). Thus the incoming pulse train to be delayed is written in to the core matrix group in such a manner that each of its $n$ pulses are stored in one of the associated core matrices $101_1$–$101_n$.

The read-out operation is as follows:

After Y-direction counter 208 is stepped through a count of $n$ it automatically resets itself to initiate a new count. Upon completion of a count of $n$ Y-direction counter 208 transmits a pulse via line 221 in order to advance the count of X-direction counter 210 by one. At this time conversion circuit 203 identifies the incoming synchronizing pulses as being indicative of a read-out period causing read-out timing pulses to be impressed upon lead 205. These read-out timing pulses are impressed upon all of the gate circuits of X-drive gate group 212. One of the group of M X-gates 212 is opened due to the simultaneous presence of read-out pulses and a signal from X-direction counter 210 causing one of the group of X-drive amplifiers 214 to be energized such that row winding X$b$ of core matrix $101_1$ of FIGURE 1 is energized. Although X-direction counter 210 impresses a like signal upon one of the gates of X′-drive gate group 211, the absence of write-in timing pulses during the read-out period prevents the selected X′-gate from being opened. Thus during the first count of Y-direction counter 208 the Y-drive winding S and the X-drive winding X$b$ of core matrix $101_1$ are energized in order to drive the cores $b$–1—$b$–4 to the binary zero state. Only those cores which have been in the binary one state will indicate the presence of a binary one condition at the associated read-out windings $R_1$–$R_4$ in the manner previously described.

Y-direction counter 208, under control of the read-out timing pulses impressed upon the counter by lead 219, operates through a count of $n$ in order to energize each of the Y-drive windings of core matrices $101_1$–$101_n$ on a one at a time basis. As was previously described, the X′-drive winding configuration of FIGURE 1 is such that the pulse train to be delayed will not be generated during the first read-out period but will be generated during the second read-out period so that no pulse train is generated during the first read-out period.

When the Y-direction counter 208 has operated through a full count of length $n$ the counter will reset thereby advancing X-direction counter 210 by a count of one in order to begin the next or second read-out period. Conversion circuit 203 continues to identify the incoming synchronizing pulses as read-out pulses in order to operate control circuit 200 through the second read-out period. Depending upon the length of the time delay to be imposed upon the incoming signal pulse train, control circuit 200 will operate through a predetermined number of read-out periods until the selected time delay period is achieved.

As a modification of the instant invention if it is desired to simultaneously impress all of the pulse bits of the incoming pulse train upon the core matrix group $101_1$–$101_n$ this may be done simply by impressing all of the pulses of the incoming pulse train simultaneously upon the write-in windings $W_1$–$W_4$ of each of said core matrices $101_1$–$101_n$ and further to simultaneously drive all of the Y-drive amplifiers 209 into the energized state instead of driving the Y-drive amplifiers in a sequential fashion, as previously described. During the read-out period all of the Y-drive amplifiers 209 are again simultaneously energized such that all of the pulses of the delay pulse train will be read-out in parallel at the read-out windings $R_1$–$R_4$ of the core matrices $101_1$–$101_n$. It should be noted here that it is very often desirable to operate the electric signal delay circuit of the invention in the following manner.

For simplicity, the number N of columns is assumed to be four: the number M of rows, also four; and the number *n* of the matrices, three. It is also assumed that the X*a*′ drive windings thread the magnetic elements in manner shown in FIG. 1, the X′*b* drive winding being connected to lead X1′ so as to thread the magnetic element *a*–4; the X′*c* drive winding being connected to lead X*m*′ so as to thread the magnetic elements *a*–2, *a*–3, and *b*–4; and the X′*d* drive winding being connected to lead X*n*′ so as to thread the magnetic elements *b*–2, *b*–3, and *c*–4. It is furthermore assumed that only for the purpose of clarifying the explanation, the incoming pulse train is a time sequence of sets of four simultaneously appearing pulses (0001), (0010), (0101), (1000), (0010), (0000), (1111) . . ., the sets appearing at the input terminal 201 in time correspondence with timing pulses Nos. 1, 2, 3, 4, 5, 6, 7 . . . impressed on the timing pulse input terminal 202, respectively. The conversion circuit 203 produces write-in timing pulses on the write-in timing pulse lead 204 in a predetermined time relation with respect to the respective timing pulses, and read-out timing pulses on the read-out timing pulse lead 205, the No. *k* ($k$=1, 2, 3 . . . ) read-out timing pulse being produced after the No. *k* write timing pulse and before the No. $k+1$ write timing pulse. The predetermined time relation is determined in consideration of the unavoidable delay caused by the write-in amplifiers 206 on the respective pulses in the pulse set and of the time relation between the incoming pulse sets and the timing pulses. Each write-in timing pulse operates the write-in amplifiers 206 to supply the amplified pulses of a pulse set to the core matrices 207 through the write-in windings $W_1$, $W_2$, $W_3$, and $W_4$, respectively. The write-in timing pulses are also supplied successively to the Y-direction counter 208, which in the instant case produces cyclically at its three outputs $208_1$, $208_2$, $208_3$ (not separately shown) a counter pulse. The counter pulse is now applied to the corresponding Y-drive amplifier in the Y-drive amplifier circuit 209, which are assigned to the core matrices $101_1$, $101_2$, and $101_3$, respectively. Thus, Y-drive pulses of a first polarity, each being followed by a trailing oppositely (in polarity) going Y-drive pulse as is known in the art, are cyclically applied to the core matrices 207 through the Y-drive windings S, T, and U. Each time the Y-direction counter 208 completes a cycle of count, it delivers a step pulse to the X-direction counter 210, which in the present case comprises a four stage shift register. Each time a step pulse is applied to the X-direction counter 210 an output pulse produced cylically from the shift register is supplied to the corresponding gate in the X′-drive gate circuits 211 and also to the corresponding gate in the X-drive gate circuit 212 to make the gates ready for opening. A write-in timing pulse supplied to all of the gates in the X′-drive gate circuit 211 passes through the gate to place it in a condition ready for opening, to the corresponding one in the X′-drive amplifier circuit 213. Thus X′ drive pulses, each of which are not followed by an oppositely going pulse, are cyclically supplied to the core matrices 207 through the X′-drive windings X′*a*, X′*b*, X′*c*, and X′*d*. It will thus be appreciated that X′ drive pulses on one of X′-drive windings appear every four Y-drive pulses and the X′-drive pulse, the Y-drive pulse, and the set of incoming pulses are simultaneously supplied to the core matrices 207, and X′-drive pulse being suppied to all of the corresponding X′-drive windings of the core matrices $101_1$, $101_2$, and $101_3$.

In the following description it is assumed that all the magnetic elements are driven to the "zero" saturable state during the read-out operation: that the magnitude and polarity of an X′-drive pulse and a Y-drive pulse is such that the drive pulses each may drive a magnetic element midway towards the "one" saturable state and consequently may, when combined, drive the magnetic element towards the "one" saturable state: and that the magnitude of an incoming pulse (upon an associated write-in winding) is such that if the pulse is binary zero, the same by itself may drive a magnetic element midway towards the zero saturable state (thereby acting as an inhibit pulse) while if binary one, has by itself no effect upon the state of a magnetic element. It is furthermore assumed that the incoming pulse set (0001) is supplied through the write-in amplifiers 206 to the core matrices 207 in correspondence with the No. 1 timing pulse or namely in synchronism with an X′-drive pulse on the X′*a* drive windings of the core matrices $101_1$, $101_2$, and $101_3$ and a Y-drive pulse on the Y-drive winding S. This puts the magnetic element *d*–4 of the core matrix 101, only into the one saturable state, leaving the remaining magnetic elements in the zero saturable state.

Following the write-in operation just mentioned, a read-out timing pulse supplied to all of the gates in the X-drive gate circuit 212 passes through the gate to put it in a condition ready for opening, to the corresponding X-drive amplifier in the X-drive amplifier circuit 214. Thus, an X-drive pulse of a second polarity, having no accompanying trailing oppositely going pulse, is supplied to the core matrices 207 through the X*a*-drive windings of the core matrices $101_1$, $101_2$, and $101_3$. It will be understood that X-drive pulses are similarly supplied to the core matrices 207, cylically through the X-drive windings X*a*, X*b*, X*c*, and X*d*, following the accompanied X′-drive pulses and in synchronism with the oppositely going trailing pulses of the associated Y-drive pulses.

It is now assumed that the magnitude of the X-drive pulse or the trailing Y-drive pulse is such that the drive pulses each may drive a magnetic element midway towards the zero saturable state and consequently, when combined, may drive the magnetic element towards the zero saturable state and that an output signal is obtained from a magnetic element through a readout winding passing therethrough only when the saturable state thereof is reversed. The X*a*-drive pulse and the trailing portion of the Y-drive pulse S following the write-in operation of the first (0001) pulses, therefore, produces no output signal through the read-out windings $R_1$, $R_2$, $R_3$, and $R_4$. The output signals, if any, on the read-out winding are amplified by the read-out amplifiers 215 and delivered to the output terminal 216.

In correspondence with the No. 2 timing pulse, the X′*a*-drive pulse and the Y-drive pulse T causes the second incoming pulses (0010) to be stored int he magnetic element *c*–3 of the core matrix $101_2$. The following second read-out operation produces no output signal. At the No. 3 timing pulse time point, the X′*a*-drive pulse and the Y-drive pulse U causes the third incoming pulses (0101) to be stored in the magnetic elements *c*–2 and *d*–4 of the core matrix $101_3$. The following read out operation again produces no output signal. At the No. 4 timing pulse time point, the X′*b* drive pulse and the Y drive pulse S cause the fourth incoming pulses (1000) to be stored in the magnetic element *b*–1 in the core matrix $101_1$. The following read-out operation now produces an output signal on the read-out winding $R_1$. At the No. 5 timing pulse point, the X′*b*-drive pulse and the Y-drive pulse T cause the fifth incoming (0010) pulse to be stored in the magnetic element *d*–3 of the core matrix $101_2$. The stored pulse will be afterwards read out by a simultaneous application of the X*d* drive pulse and the Y drive pulse T immediately following the occurrence of the No. 11 timing pulse. At the No. 6 timing pulse time point, no write-in is performed because the supplied incoming pulses are (0000). At the No. 7 timing pulse time point, the X′*c*-drive pulse and the Y-drive pulses S cause the seventh incoming (1111) pulse to be stored in the magnetic elements *c*–1, *a*–2, *a*–3, and *b*–4 of the core matrix $\mathbf{101}_1$. The pulse stored in the magnetic element *c*–1 is read out at the immediately following read-out operation by simultaneous appearance of the X*c* drive pulse and the Y-drive pulse S; the pulses stored in the magnetic elements *a*–2 and *a*–3 will be read out when the X*a* drive windings of the core matrices 207 and the Y-drive winding S are simultaneously energized immediately after appearance of the No. 13 timing pulse; the pulse stored in the magnetic element *b*–4 will be read out when the X*b* drive windings of the core matrices 207 and the Y-drive winding S are simultaneously energized during the time interval defined by the No. 16 timing pulse.

With the delay circuit so far described, it is thus possible to delay an incoming pulse supplied through the selected one of the write-in windings $W_1$, $W_2$, $W_3$, and $W_4$ in the manner given in the following table, in which an incoming pulse of the binary one state, if any, written into the core matrices 207 in correspondence with the timing pulses Nos. 1, 2, 3 . . . is denoted with No. 1, No. 2, No. 3 . . . .

| Time of read out | Output signal read out on— | | | |
|---|---|---|---|---|
| | $R_1$ | $R_2$ | $R_3$ | $R_4$ |
| X*a* S | No. 1 | | | |
| X*a* T | No. 2 | | | |
| X*a* U | No. 3 | | | |
| X*b* S | No. 4 | | | |
| X*b* T | No. 5 | | | |
| X*b* U | No. 6 | | | |
| X*c* S | No. 7 | No. 1 | No. 1 | |
| X*c* T | No. 8 | No. 2 | No. 2 | |
| X*c* U | No. 9 | No. 3 | No. 3 | |
| X*d* S | No. 10 | No. 4 | No. 4 | No. 1 |
| X*d* T | No. 11 | No. 5 | No. 5 | No. 2 |
| X*d* U (the second) | No. 12 | No. 6 | No. 6 | No. 3 |
| X*a* S | No. 13 | No. 7 | No. 7 | No. 4 |
| X*a* T | No. 14 | No. 8 | No. 8 | No. 5 |

It should also be noted now, that in practice the core matrices 100 may preferably be formed by threading the X′-drive winding from the first core matrix $\mathbf{101}_1$ to the last core matrix $\mathbf{101}_n$, the magnetic elements arranged at the same matrix element positions (the same column and row), then returning from the last core matrix $\mathbf{101}_n$ to the first core matrix $\mathbf{101}_1$, the other sets of magnetic elements arranged at the corresponding matrix element positions, and thereafter recurring from front to back and from back to front threading. For example, the X′*a* drive winding threads through, in succession, the magnetic element *a*–1 of the core matrix $\mathbf{101}_1$, the corresponding ones in the core matrices $\mathbf{101}_2$, $\mathbf{101}_3$ . . ., and $\mathbf{101}_n$, such magnetic elements in the core matrices $\mathbf{101}_n$, $\mathbf{101}_{n-1}$ . . ., and $\mathbf{101}_2$ as may correspond to the magnetic element *c*–2 of the core matrix $\mathbf{101}_1$, the last-mentioned magnetic element *c*–2, the magnetic element *c*–3 of the core matrix $\mathbf{101}_1$, the corresponding ones in the core matrices $\mathbf{101}_2$, $\mathbf{101}_3$ . . ., and $\mathbf{101}_n$, and so on. Also, the X-drive winding may thread the magnetic elements in from front to back and from back to front fashion. The write-in winding may thread the magnetic elements of a column from top to bottom, then the corresponding column of the next core matrix from bottom to top, and thereafter repeating the from top to bottom and from bottom to top fashion. The read-out winding may thread the magnetic elements of the corresponding columns of the core matrices in the manner shown for the Y-drive winding S in FIG. 1. In this case, the Y-drive winding which is associated with each core matrix may thread the magnetic elements of a core matrix along the columns in from top to bottom and from bottom to top fashion.

It should furthermore be noted that the desired delay time is given by the relative spacing of the coupled X- and X′-drive windings and consequently that the drive winding arranged in straight line fashion through the magnetic elements in row fashion may be used on writing in the incoming pulses to the core matrices, while the staggered drive windings may be used on reading out the stored pulses.

As another modification the X′ drive windings may be threaded through the memory core elements in such a way that in addition to delaying each of the pulses of the incoming pulse train to be delayed the pulses may further be rearranged so that they occupy time slots different from those time slots which they occupied previous to being delayed. Another way of considering this is to consider that certain of the pulses of a pulse train will be delayed for a greater time period than the period of the remaining pulse of the incoming pulse train whereas in the examples previously described all of the pulses of an incoming pulse train will be delayed by the same time period so that they will occupy the same pulse position as they occupied previous to the imposition of the delayed period.

Although the principles of this invention have been described above in connection with a specific embodiment, the description is made simply by way of example only and said description should not be constructed in array was as a limitation to the scope of this invention. For example, the electric signal delay circuit according to this invention can perform the delay action as above mentioned combined with the buffer memory action, provided a synchronizing signal train indicative of the read-out timing be prepared separate from a synchronizing signal train indicative of the write-in timing so as to operate the read-out and write-in counters independently of each other by these synchronizing trains and further, a suitable number of magnetic cores be annexed.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A variable electric signal delay means comprising:
   - a magnetic element matrix composed of saturable magnetic elements arranged in regular rows and columns;
   - columnar write-in windings each threading all magnetic elements of an associated column in said matrix;
   - a group of first row windings each threading all magnetic elements of an associated row of said matrix;
   - a group of second row windings associated with each of the rows of said matrix and threading at least one magnetic element of its associated row;
   - each of the second row windings threading at least one magnetic element of at least two rows other than the row with which said second row winding is associated; the magnetic elements of each row of the matrix which are threaded by a common second row winding being located in a column other than the columns occupied by the magnetic elements of adjacent rows which the common second row winding threads to affect said variable signal delay.

2. Available electric signal delay means comprising a magnetic element matrix composed of saturable magnetic elements arranged in regular rows and columns; columnar write-in windings each threading all of the magnetic elements of each associated column of said matrix; a group of first row windings each threading all of the magnetic elements of each associated row of said matrix; a group of second row windings associated with each of the rows of said matrix each threading at least one magnetic element of its associated row; each of the second row windings threading at least one magnetic element of a row other than the row with which said second row winding is associated to effect said variable signal delay, a drive winding threading all magnetic elements of said matrix; columnar read-out windings each threading all of the magnetic elements of each associated column of said matrix; input means normally energizing all of said columnar write-in windings including means for receiving an input signal to be delayed, said input means being adapted to inhibit energization of selected ones of said write-in column windings in accordance with the input signal received; second means for energizing said drive winding and one of said second row windings simultaneously with the energization of selected ones of said write-in windings to alter the saturable state of selected ones of said magnetic elements; said second means comprising third means for sequentially energizing said first row windings to reset said altered magnetic elements a predetermined time after completion of the write-in operation; said predetermined time delay period being dependent upon the threading configuration of said second row windings and the write-in column winding which is de-energized.

3. A variable electric signal delay means comprising a magnetic element matrix composed of saturable magnetic elements arranged in regular rows and columns; columnar write-in windings each threading all of the magnetic elements of each associated column of said matrix; a group of first row windings each threading all of the magnetic elements of each associated row of said matrix; a group of second row windings associated with each of the rows of said matrix each threading at least one magnetic element of its associated row; said matrix having at least four rows each of the second row windings threading at least one magnetic element of each of the remaining rows of the matrix; the magnetic elements of each row of the matrix which are threaded by a common second row winding being located in a column other than the columns occupied by the magnetic elements of adjacent rows which the common second row winding threads.

4. Variable electric signal delay means comprising means for receiving input signals to be delayed; a source of synchronizing signals occurring in synchronism with said input signals; a magnetic core matrix composed of saturable magnetic elements arranged in regular rows and columns; said matrix having a group of write-in row windings, a group of readout column windings, each threading all of the magnetic elements in an associated column and a group of read-out row windings each threading all elements in an associated row; a drive winding threading through all magnetic cores of said core matrix and a group of write-in column windings each threading through all magnetic cores of said core matrix in an associated column; first means controlled by said input signals for enabling energization of selected ones of said write-in column windings; second means controlled by said synchronizing signals adapted to sequentially energize each write-in row winding of said matrix; third means controlled by said synchronizing signals for energizing said drive winding; said write in row windings each threading through magnetic cores of a plurality of different rows; fourth means for energizing said first and second and third means simultaneously with the selective energization of said write-in column windings during a write-in operation and further adapted to sequentially energize said read-out row windings and energize said drive winding during a read-out operation; said read-out operation having a plurality of read-out periods substantially equal in number to the number of rows of said matrix; said input signals being read-out from said read-out column winding during a selected one of said read-out periods whereby the time delay imposed upon said input signals is determined by the write-in column winding which have been de-energized during the write-in period and the threading arrangement of said write-in row windings.

5. Electric signal delay means comprising means for receiving input signals to be delayed; a source of synchronizing signals occurring in synchronism with said input signals; a plurality of magnetic core matrices each being comprised of saturable magnetic elements arranged in regular rows and columns; each having a group of write-in row windings, a group of columnar sense windings and a group of read-out row windings; a drive winding threading all magnetic cores of said matrix and a group of normally energized write-in column windings each threading all magnetic elements of associated columns of said core matrix; first means controlled by said input signals for de-energizing selected ones of said write-in column windings; second means controlled by said synchronizing signals adapted to sequentially energize each write-in row winding of said matrices; third means controlled by said synchronizing signals for sequentially energizing the drive windings of each of said matrices; said write-in row windings threading through magnetic cores of a plurality of different rows; fourth means for energizing said first and second and third means simultaneously with the de-energization of selected ones of said write-in column windings during a write-in operation and further adapted to sequentially energize said read-out row windings and said drive winding during a read-out operation; said read-out operation having a plurality of read-out periods substantially equal in number to the number of rows of said matrix; said input signals being read out from said columnar sense windings during a selected one of said read-out periods whereby the time delay imposed upon said input signals is determined by the write-in column windings which have been de-energized during the write-in period and the threading arrangement of said write-in row windings.

6. Electric signal delay means comprising means for receiving input signals to be delayed; a source of synchronizing signals occurring in synchronism with said input signals; a plurality of magnetic core matrices each being comprised of saturable magnetic elements arranged in regular rows and columns, each having a group of write-in row windings, a group of columnar sense windings and a group of read-out row windings; a drive winding threading all magnetic cores of said matrix and a group of normally energized write-in column windings each threading all magnetic elements of associated columns of said core matrix; first means controlled by said input signals for de-energizing selected ones of said write-in column windings; second means controlled by said synchronizing signals adapted to sequentially energize each write-in row winding of said matrices; third means controlled by said synchronizing signals for sequentially energizing the drive windings of each of said matrices; said write-in row windings each threading through magnetic cores of a plurality of different rows; fourth means for energizing said first and second and third means simultaneously with the energization of said write-in windings during a write-in operation and further adapted to sequentially energize said read-out row windings and said drive winding during a read-out operation; said read-out operation having a plurality of read-out periods substantially equal in number to the number of rows of said matrix; said input signals being read out from said columnar sense windings during a selected one of said read-out periods whereby the time delay imposed upon said input signals is determined by the write-in column windings which have been de-energized during the write-in period and the threading arrangement of said write-in row windings, said second means comprising first counting means for generating a count substantially equal in number to the number of rows of said matrices.

7. Electric signal delay means comprising means for receiving input signals to be delayed; a source of synchronizing signals occurring in synchronism with said input signals; a plurality of magnetic core matrices each being comprised of saturable magnetic elements arranged in regular rows and columns, each having a group of write-in row windings, a group of columnar sense windings and a group of read-out row windings; a drive winding threading all magnetic cores of said matrix and a group of normally energized write-in column windings threading all of the elements in associated columns of said core matrix; first means controlled by said input signals for de-energizing selected ones of said write-in column windings; second means controlled by said synchronizing signals adapted to sequentially energize each write-in row winding of said matrices; third means controlled by said synchronizing signals for sequentially energizing the drive windings of each of said matrices; said write-in row windings each threading through magnetic cores of a plurality of different rows; fourth means for energizing said first and second and third means simultaneously with the de-energization of selected ones of said write-in column windings during a write-in operation and further adapted to sequentially energize said read-out row windings and said drive winding during a read-out operation; said read-out operation having a plurality of read-out periods substantially equal in number to the number of rows of said matrix; said input signals being read out from said columnar sense winding during a selected one of said read-out periods whereby the time delay imposed upon said input signals is determined by the write-in column winding which has been de-energized during the write-in period and the threading arrangement of said write-in row windings; said second means comprising first counting means for generating a count substantially equal in number to the number of rows of said matrices; said third means comprising second counting means for generating a count equal in number to the number of matrices.

8. Electric signal delay means comprising means for receiving input signals to be delayed; a source of synchronizing signals occurring in synchronism with said input signals; a plurality of magnetic core matrices each being comprised of saturable magnetic elements arranged in regular rows and columns each having a group of write-in row windings, a group of columnar sense windings and a group of read-out row windings; a drive winding threading all magnetic cores of said matrix and a group of normally de-energized write-in column windings threading the elements of associated columns of said core matrix; first means controlled by said input signals for de-energizing selected ones of said write-in column windings; second means controlled by said synchronizing signals adapted to sequentially energize each write-in row winding of said matrices; third means controlled by said synchronizing signals for sequentially energizing the drive windings of each of said matrices; said write-in row windings each threading through magnetic cores of a plurality of different rows; fourth means for energizing said first and second and third means simultaneously with the de-energization of selected ones of said write-in column windings during a write-in operation and further adapted to sequentially energize said read-out row windings and said drive winding during a read-out operation; said read-out operation having a plurality of read-out periods substantially equal in number to the number of rows of said matrix; said input signals being read out from said columnar sense winding during a selected one of said read-out periods whereby the time delay imposed upon said input signals is determined by the write-in column winding which has been de-energized during the write-in period and the threading arrangement of said write-in row windings; said second means comprising first counting means for generating a count substantially equal in number to the number of rows of said matrices; said third means comprising second counting means for generating a count equal in number to the number of matrices; said third means being adapted to reset itself automatically at the completion of the counting operation.

9. Electric signal delay means comprising means for receiving input signals to be delayed; a source of synchronizing signals occurring in synchronism with said input signals; a plurality of magnetic core matrices each being comprised of saturable magnetic elements arranged in regular rows and columns, each having a group of write-in row windings, a group of columnar windings and a group of read-out row windings; a drive winding threading all magnetic cores of said matrix and a group of normally energized write-in column windings threading the elements of associated columns of said core matrix; first means controlled by said input signals for de-energizing selected ones of said write-in column windings; second means controlled by said synchronizing signals adapted to sequentially energize each write-in row winding of said matrices; third means controlled by said synchronizing signals for sequentially energizing the drive windings of each of said matrices; said write-in row windings each being threaded through magnetic cores of a plurality of different rows; fourth means for energizing said first and second and third means simultaneously with the de-energization of said write-in row windings during a write-in operation and further adapted to sequentially energize said read-out row windings and said drive winding during a read-out operation; said read-out operation having a plurality of read-out periods substantially equal in number to the number of rows of said matrix; said input signals being read out from said columnar sense winding during a selected one of said read-out periods whereby the time delay imposed upon said input signals is determined by the write-in column winding which has been de-energized during the write-in period and the threading arrangement of said write-in row windings; said second means comprising first counting means for generating a count substantially equal in number to the number of rows of said matrices; said third means comprising second counting means for generating a count equal in number to the number of matrices; said third means being adapted to reset itself automatically at the completion of the counting operation; said second means being controlled by said third means and being adapted to advance its count by one each time said third means completes its counting operation.

References Cited

UNITED STATES PATENTS

| | | | |
|---|---|---|---|
| 3,075,183 | 1/1963 | Warman | 340—174 |
| 3,090,037 | 5/1963 | Shahan | 340—174 |
| 3,147,474 | 9/1964 | Kliman | 340—174 |
| 3,210,735 | 10/1965 | Heijn | 340—174 |
| 3,229,264 | 1/1966 | Lee | 340—174 |

TERRELL W. FEARS, *Primary Examiner.*

B. KONICK, *Examiner.*

G. LIEBERSTEIN, M. S. GITTES, *Assistant Examiners.*